Oct. 28, 1947.   R. W. LUCE   2,429,833

FASTENING MEANS

Filed March 21, 1944

INVENTOR
Richard W. Luce
BY
George F. Gill
ATTORNEY

Patented Oct. 28, 1947

2,429,833

UNITED STATES PATENT OFFICE 2,429,833

FASTENING MEANS

Richard W. Luce, Southport, Conn.

Application March 21, 1944, Serial No. 527,449

3 Claims. (Cl. 85—32)

The invention herein disclosed relates to fastening means of the type in which a fastener or nut is secured in place on a structural member by a retainer. Such structures, commonly termed anchor nuts and gang channel nut structures, depending upon whether one or more nuts are assembled in a retainer, are frequently used where a blind fastening is required, such for example where a plate or other structural member to be fastened renders the nut inaccessible.

Fastener means of this type have heretofore been provided in which the nut has limited movement in all lateral directions to accommodate for misalignment of openings. Frequently, however, the openings are not only out of axial alignment but are so drilled or related that the screw goes in at an inclination to the normal of the surface of the plate. This condition has caused considerable difficulty as it results in cross threading of the nut and bolt. In many such cases, this condition has required the taking apart of assembled structures with the result of great loss of time and labor.

An object of this invention is to provide a fastening means of this kind in which the fastener or nut has angular as well as lateral accommodation. A further object of the invention is to provide such a structure in which the nut and screw become aligned upon entry of the screw in the nut.

The foregoing objects and certain advantages that will hereinafter appear are realized in the embodiments of the invention illustrated in the accompanying drawing and described in detail below.

Figure 1:
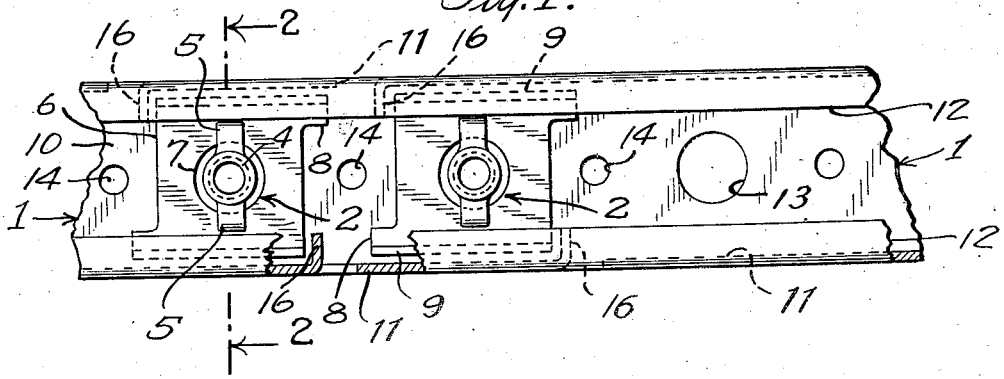
Figure 2:
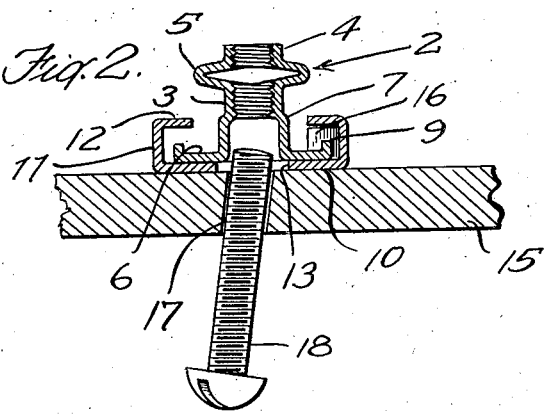
Figure 4:
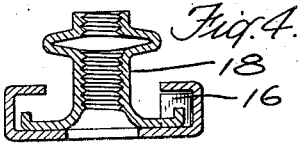
Figure 5:
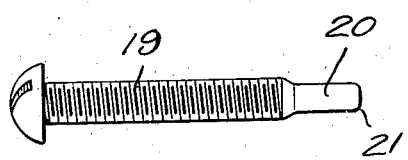
Figure 3:
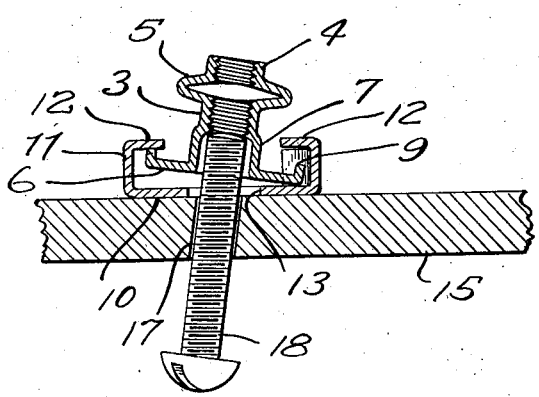

The drawings include:

Fig. 1 which is a plan of a gang channel nut structure embodying this invention;

Fig. 2 which is a transverse section of the same taken on the line 2—2 of Fig. 1;

Fig. 3 which is a section similar to Fig. 2, but showing the nut tilted;

Fig. 4 which is a transverse section of a modified form of the nut structure; and Fig. 5 which is a plan of a screw to be used with the nut structure of Fig. 4.

In Figs. 1 to 3, there is shown a nut structure that includes a nut retainer 1 and two nuts 2 loosely retained by the nut retainer. For the purpose of illustrating an embodiment of the invention a gang channel structure has been shown. The nut retainer may, however, be formed to retain a single nut or of such length as to hold any number of nuts and maintain them in predetermined, spaced relation.

Although the nut 2 may be a simple nut, there is illustrated a lock nut of the kind shown and described in my prior Patent No. 2,265,661, issued December 9, 1941. The nut illustrated is constructed from sheet metal and the nut proper includes a hollow internally threaded shank 3 the thread of which constitutes the load carrying thread. A smaller threaded portion 4 is secured to the shank 3, axially spaced from the end thereof, by resilient loops 5. This is the lock-nut of the aforesaid Patent No. 2,265,661.

The nut is provided with a base 6 to which it is connected by a skirt or pilot receiving end portion 7. The skirt 7 is of an internal diameter slightly greater than the major or larger diameter of the thread. No thread is formed in the skirt; it constitutes a smooth, pilot-receiving cylindrical extension on the nut. The base 6 of the nut is substantially square. At diagonally opposite corners, there are provided extensions 8. Opposite edges of the base are bent to form upstanding flanges 9.

The channel member comprises a web 10, side flanges 11 and overhanging extensions 12, extending inwardly from the edges of the side flanges and parallel to the plane of the web. At spaced intervals, the web of the channel has screw receiving openings 13 therethrough and intermediate these openings, there are smaller openings 14 through the web. These latter openings 14 are provided for rivets by means of which the channel is secured to a plate or structural member such as the member 15.

A nut is assembled in the channel by inserting the base in the end of the channel and moving the nut to position over a screw receiving opening 13. When in position tangs or tongues 16 are struck from the flanges and bent inwardly. A tang is provided at diagonally opposite corners of the base of the nut. These tangs are spaced apart such that the nut has limited movement lonigtudinally of the channel. The distance between the flanges 11 of the channel is slightly greater than the width of the base of the nut but less than the diagonal so that the nut has limited movement transversely of the channel but it is restrained against rotation with respect to the channel.

The width of the flanges 11 is substantially greater than the thickness of the base of the nut including the flanges 9. The tangs 16 are substantially the width of the flanges so that in any position the base of the nut cannot slip past a tang. Also, the overhanging extensions 12 are of such length that when the nut is tilted, the base cannot pass the flange. Thus, the nut has limited movement in all lateral directions and limited relative movement angularly of the axis or at an inclination, in all directions, to the normal to the base of the nut.

In Figs. 2 and 3, the nut retainer is shown as applied to a structural member 15 in which a screw opening 17 is inclined to the normal to the surface of the structural member. When a screw, such as the screw 18 is entered through the opening, it is constrained to an inclination to the axis of the nut and, with nut structures such as those available prior to this invention, the nut and bolt would be cross threaded, if it were possible to force the screw in. This would result in stripping the threads and a failure of the fastening.

With the nut structure of this application, the end of the screw enters in the pilot-receiving skirt 7. Upon being rotated or driven in, the engagement between the pilot-receiving skirt 7 and the screw causes the nut to tilt and become axially aligned with the screw. This condition is illustrated in Fig. 3. When the end of the screw enters the body portion 3 of the nut, the screw and nut are axially aligned and the threads match. As the base of the nut is made of sheet metal, it will, when the screw is drawn home tightly, tend to bend and provide a flat contact, for an area of part of the base at least, rather than an edge contact.

When the screw is turned in the nut, diagonally opposite corners of the nut engage the side flanges 11 of the channel member. Without the flanges 9 on the base of the nut, the sharp corners would tend to cut through the flanges 11. The flanges 9, however, provide sufficient contact to prevent the cutting of the flanges.

The nut structure illustrated in Fig. 4 is the same as that illustrated in Figs. 1 to 3, with the exception of the nut 18. The difference is that the nut 18 does not have a pilot-receiving skirt. For the satisfactory functioning of this arrangement, special screws are required. Such a screw 19 is shown in Fig. 5. This screw has a reduced end section 20 which constitutes a pilot. The diameter of this pilot section is slightly less than the minor diameter of the thread so that it is readily received in the nut. Preferably, the end edge 21 of the pilot section has a rounded edge, and the pilot section merges into the threaded section in a smooth curve. When this screw is entered through an inclined opening or at an angle to the axis of the nut, the pilot section freely entering the nut aligns the nut with the screw.

It will be obvious that various other changes may be made by those skilled in the art in the details of the embodiments of the invention illustrated in the drawings and described in detail above within the principle and scope of the invention as expressed in the appended claims.

I claim:

1. A fastening means of the kind described comprising in combination a channel-shaped nut retainer consisting of a web having a screw-receiving opening therethrough, side flanges having inturned portions extending parallel to the web and spaced inturned tangs struck from the flanges and extending substantially lateral thereto, a nut having a base within the channel of substantially less thickness than the width of the side flanges, whereby the nut may tilt to receive in axial alignment a screw entered through the screw-receiving opening of the web at an angle to the axis thereof, the inturned portions of the flanges being of such width as to retain the base of the nut in its tilted position, and the inturned tanks being of such width as to prevent the base of the nut in its tilted position from moving past a tang.

2. A fastening means of the kind described comprising in combination a channel-shaped nut retainer consisting of a web having a screw-receiving opening therethrough, side flanges having inturned portions extending parallel to the web and spaced inturned tangs struck from the flanges and extending substantially lateral thereto, a nut substantially aligned with the screw-receiving opening in the web and having a base within the channel and an unthreaded pilot section adjacent the base, the base of the nut being of less thickness than the width of the flanges, whereby the nut may tilt to receive in axial alignment a screw entered through the screw-receiving opening of the web at an angle to the axis thereof, the inturned portions of the flanges being of such width as to retain the base of the nut in its tilted position, and the inturned tangs being of such width as to prevent the base of the nut from moving past a tang in its tilted position.

3. A fastening means of the kind described comprising in combination a channel-shaped nut retainer consisting of a web having a screw-receiving opening therethrough, side flanges having inturned portions extending parallel to the web and spaced inturned tangs struck from the flanges and extending substantially lateral thereto, a nut substantially aligned with the screw-receiving opening in the web and having a substantially square base within the channel, the edges of the base adjacent the side flanges being curved and the base being of substantially less thickness than the width of the flanges, whereby the nut may tilt to receive in axial alignment, a screw entered through the screw-receiving opening of the web at an angle to the axis thereof, the inturned portions of the flanges being of such width as to retain the base of the nut in its tilted position, and the inturned tangs being of such width as to prevent the base of the nut from moving past a tang in its tilted position.

RICHARD W. LUCE.

REFERENCES CITED

The following references are of record in the file of this patent:

UNITED STATES PATENTS

| Number | Name | Date |
|---|---|---|
| 1,925,753 | Fitch | Sept. 5, 1933 |
| 447,775 | Higbee | Mar. 10, 1891 |
| 1,961,470 | Winchester | June 5, 1934 |
| 1,484,402 | Martin | Feb. 19, 1924 |
| 1,394,608 | Davern | Oct. 25, 1921 |
| 1,909,941 | Finch | May 23, 1933 |
| 2,078,411 | Richardson | Apr. 27, 1937 |
| 2,208,532 | Woodward | July 16, 1940 |
| 2,144,350 | Swanstrom | Jan. 17, 1939 |
| 2,237,595 | Dyer | Apr. 8, 1941 |
| 2,249,923 | Whitcombe | July 22, 1941 |
| 2,299,158 | Luce | Oct. 20, 1942 |
| 1,385,799 | Smith | July 26, 1921 |
| 2,265,661 | Luce | Dec. 9, 1941 |

FOREIGN PATENTS

| Number | Country | Date |
|---|---|---|
| 596,470 | France | Aug. 8, 1925 |